United States Patent [19]

Laumann et al.

[11] 4,112,875
[45] Sep. 12, 1978

[54] HYDROGEN-FUELED ENGINE

[76] Inventors: James C. Fletcher, Administrator of the National Aeronautics and Space Administration, with respect to an invention of Eugene A. Lauman, Pasadena; Rollin K. Reynolds, Tujunga, both of Calif.

[21] Appl. No.: 718,268

[22] Filed: Aug. 27, 1976

[51] Int. Cl.² .................. F02B 75/12; F02B 43/08
[52] U.S. Cl. .................................. 123/1 A; 123/3; 123/DIG. 12
[58] Field of Search .......... 123/1 A, 3, 119 A, 119 E, 123/DIG. 12; 204/129; 431/2, 4

[56] References Cited

U.S. PATENT DOCUMENTS

| | | | |
|---|---|---|---|
| 1,905,627 | 4/1933 | Holland | 123/119 E |
| 2,169,844 | 8/1939 | Marshall | 123/119 E |
| 2,183,674 | 12/1939 | Erren | 123/DIG. 12 |
| 2,742,885 | 4/1956 | Thwaites | 123/119 A |
| 2,937,634 | 5/1960 | Kelseaux | 123/DIG. 12 |
| 3,459,953 | 8/1969 | Hughes | 123/119 E |
| 3,572,297 | 3/1971 | Murray | 123/119 E |
| 3,672,341 | 6/1972 | Smith | 123/119 E |
| 3,970,054 | 7/1976 | Henault | 123/DIG. 12 |
| 3,982,878 | 9/1976 | Yamane | 431/4 |
| 4,003,345 | 1/1977 | Bradley | 123/DIG. 12 |

FOREIGN PATENT DOCUMENTS 831,429  12/1937  France .................. 123/DIG. 12

*Primary Examiner*—Charles J. Myhre
*Assistant Examiner*—Craig R. Feinberg
*Attorney, Agent, or Firm*—Wilfred Grifka; John R. Manning; Monte F. Mott

[57] ABSTRACT

A hydrogen-oxygen fueled internal combustion engine is described herein, which utilizes an inert gas, such as argon, as a working fluid to increase the efficiency of the engine, eliminate pollution, and facilitate operation of a closed cycle energy system. In a system where sunlight or other intermittent energy source is available to separate hydrogen and oxygen from water, the oxygen and inert gas are taken into a diesel engine into which hydrogen is injected and ignited. The exhaust is cooled so that it contains only water and the inert gas. The inert gas in the exhaust is returned to the engine for use with fresh oxygen, while the water in the exhaust is returned to the intermittent energy source for reconversion to hydrogen and oxygen.

6 Claims, 2 Drawing Figures

HYDROGEN-FUELED ENGINE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to hydrogen fueled engines.

Considerable efforts have recently been directed towards utilizing intermittent natural power sources, such as sunlight, to generate hydrogen for use when power is not available from the natural source. Hydrogen can be utilized as the fuel in a diesel engine, in combination with air. However, if an engine with a high compression ratio is utilized to increase the efficiency of operation, then nitrous oxide pollution is generated. A system which substantially eliminated such pollution, while also providing greater efficiency in engine operation, would enable the production of mechanical or electrical energy at lower cost.

SUMMARY OF THE INVENTION

In accordance with the present invention, a hydrogen-fueled energy system is provided which is of high efficiency and which produces substantially no pollution. The system includes an engine powered by hydrogen and oxygen, with an inert gas as a working fluid. The inert gas permits operation at very high thermal efficiencies for any given volumetric compression ratios. The exhaust of the engine contains substantially no pollutants, and can be cooled to separate liquid water from the working fluid. The working fluid can be returned to the engine, while the water can be utilized in the production of hydrogen and oxygen.

The novel features of the invention are set forth with particularity in the appended claims. The invention will be best understood from the following description when read in conjunction with the accompanying drawings.

DESCRIPTION OF PREFERRED EMBODIMENTS

Figure 1:
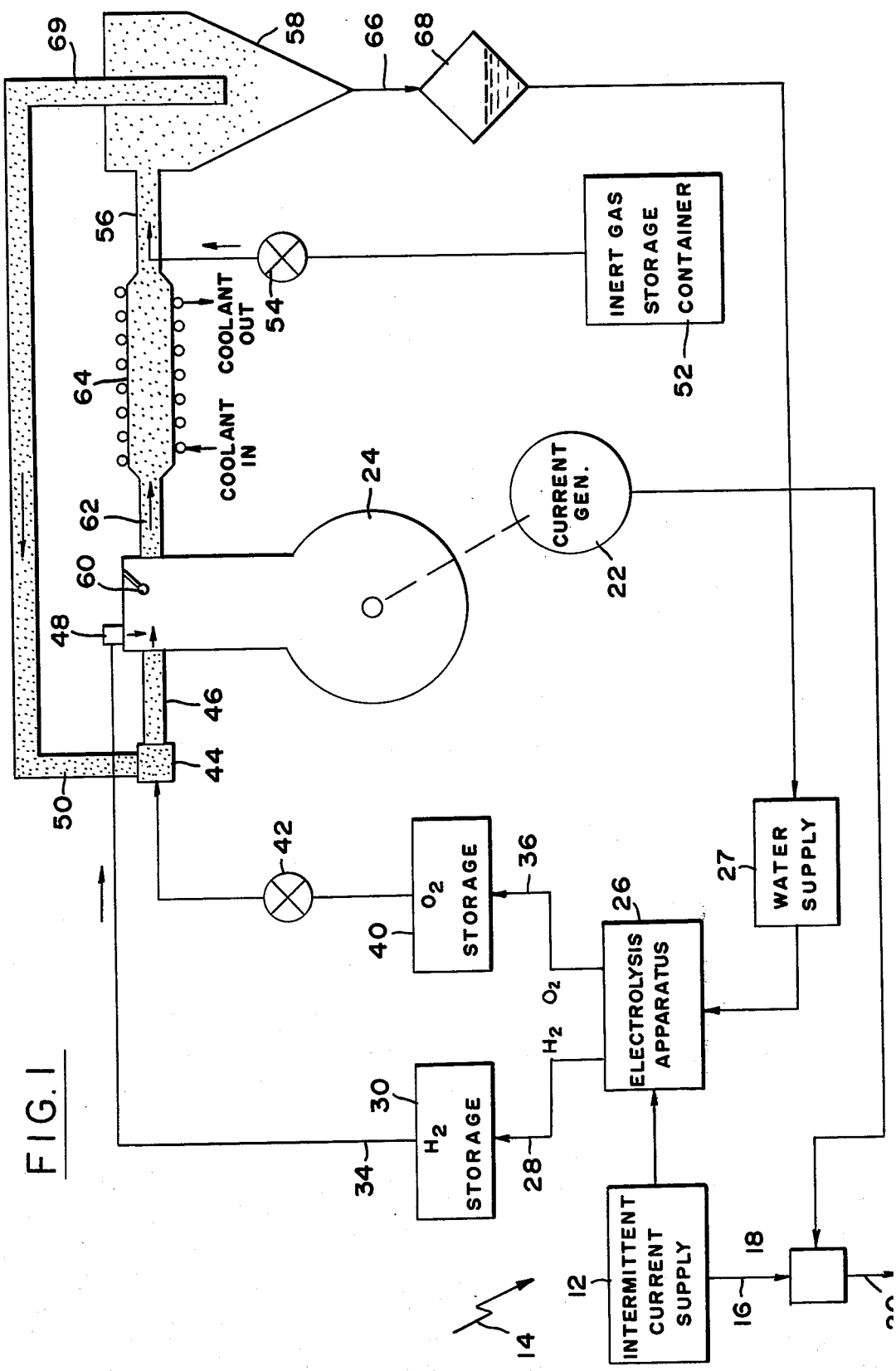
FIG. 1 is a simplified diagram of a closed cycle, hydrogen-fueled energy system, constructed in accordance with the present invention.

FIG. 1 illustrates a closed cycle energy system 10, which is based on the use of hydrogen as a fuel. The system includes an intermittent current supply 12 in the form of a bank of solar cells which receives sunlight 14 and converts it to current. During sunny days, the supply provides current over line 16 which flows through a switch 18 to an output line 20 for transmission to electricity users. On very cloudy days and at night, current is supplied through the switch 18 to the output line 20, by a current generator 22 which is driven by a diesel engine 24. During sunny days, the intermittent supply 12 also supplies current to an electrolysis apparatus 26 which receives water from a water supply 27 and separates the water into hydrogen and oxygen. The hydrogen is delivered over line 28 to a hydrogen storage device 30 which can supply pressured hydrogen on its output line 34. An oxygen outlet 36 of the electrolysis apparatus delivers oxygen to an oxygen storage device 40 which supplies pressured oxygen. The oxygen supply 40 delivers the oxygen through a control valve 42 to a carburetor 44, and the outlet 46 of the carburetor is connected to the engine 24 to supply oxygen thereto. At the same time, hydrogen from the hydrogen supply outlet 34 is delivered to an injection valve 48 which injects the hydrogen into the engine 24.

In accordance with the present invention, the working fluid, an inert gas, is supplied through a pipe 50 to the carburetor 44 to mix with the oxygen therein, so that a mixture of oxygen and the inert gas is supplied from the carburetor outlet 46 to the engine. The inert gas is initially supplied from an inert gas storage container 52 through a control valve 54 to a pipe 56 which leads to a separator 58, the inert gas in the separator 58 flowing through the pipe 50 to the carburetor 44. The proportion of inert gas, of the oxygen-inert gas mixture, is preferably great enough to constitute a majority of the mass of the mixture, and in any case should constitute more than 10%, by weight, of the oxygen-inert gas mixture.

The invention can better be understood by following the complete cycle of operation as illustrated in FIG. 1. The diesel engine 24 receives a mixture of oxygen and inert gas from the carburetor 44, and receives injected hydrogen from the injector valve 48. A glow plug 60 assures combustion of the hydrogen and oxygen to produce high pressures that move the pistons of the diesel engine. An exhaust 62 of the engine carries away the products of combustion, which includes the combined hydrogen and oxygen, in the form of steam, some residual oxygen, and the inert gas. The exhaust moves through a cooler 64 which cools the exhaust so that the steam condenses to liquid water. The exhaust passes through the pipe 56 to the separator 58, where the water falls through an outlet 66 into a gathering tank 68 which leads back to the water supply 27. The inert gas 69 in the separator 58 remains gaseous, and passes through the pipe 50 to the carburetor 44 for reuse. The inert gas storage container 52 makes up for losses of the inert gas by supplying small quantities to the system. The water in the water supply 27 is supplied to the electrolysis apparatus 26 so that it can be separated into hydrogen and oxygen for reuse in the engine. Any uncombusted oxygen and/or hydrogen is returned with the argon, through the pipe 50 for reuse. If significant amounts of carbonates or unreacted hydrocarbons are present in the exhaust (due to lubricating oil in the engine) then the carbonates and light hydrocarbons can be removed with an absorption filter and the heavy hydrocarbons can be filtered out of the water. Excessive hydrogen can be removed with a catalyst, or less hydrogen can be injected into the engine to account for hydrogen in the exhaust. Normally, a substantially stoichiometric ratio of hydrogen to oxygen is passed into the engine, although some excess oxygen can be admitted to help achieve complete combustion, the excess oxygen not being wasted since it is recycled.

The usefulness of the inert gas arises from the fact that the proper selection of the inert gas permits operation of the engine at higher thermal efficiencies than otherwise possible, and with no pollution of the atmosphere.

If it were possible to operate a diesel engine at conventional compression ratios, utilizing only oxygen and hydrogen at complete combustion, then excessive temperatures would be created that could harm the engine, when the engine were operated at close to its maximum power output. Actually, complete combustion of hydrogen and oxygen in a stoichiometric ratio (the ratio which permits complete combination) does not occur because of the quenching effect of the steam created by some of the combustion gases. When air, which contains nitrogen and oxygen, is utilized instead of pure oxygen, a lower power output is produced and the properties of nitrogen result in the production of nitrogen oxides which pollute the atmosphere.

There are several thermodynamic properties of gases that affect the efficiency of a reciprocating, internal combustion engine. Three of these properties are the specific heat of the gas at constant pressure ($C_p$), the specific heat ratio $\gamma$ of the gas which equals the specific heat at constant pressure ($C_p$) divided by the specific heat at constant volume ($C_v$), and the thermal conductivity of the gas. An ideal diluent gas has a low specific heat at constant pressure ($C_p$), a high ratio of specific heats ($\gamma$), and a low thermal conductivity.

The desirability of having low thermal conductivity arises from the fact that this will cause minimal heat loss to the walls of the cylinder in which the combusted gases lie. Low thermal conductivity also minimizes the amount of engine cooling that is required.

The desirability of employing a working fluid of low specific heat arises from the fact that such a gas will achieve a higher pressure when heated, as by the combustion of hydrogen and oxygen. Thus, for a given amount of heat resulting from combustion, the gas will rise to a higher pressure than a gas with a high specific heat. This raises the specific output of a given size engine, and as losses are mostly a function of engine size and configuration, the ratio of power output to power loss increases.

Figure 2:
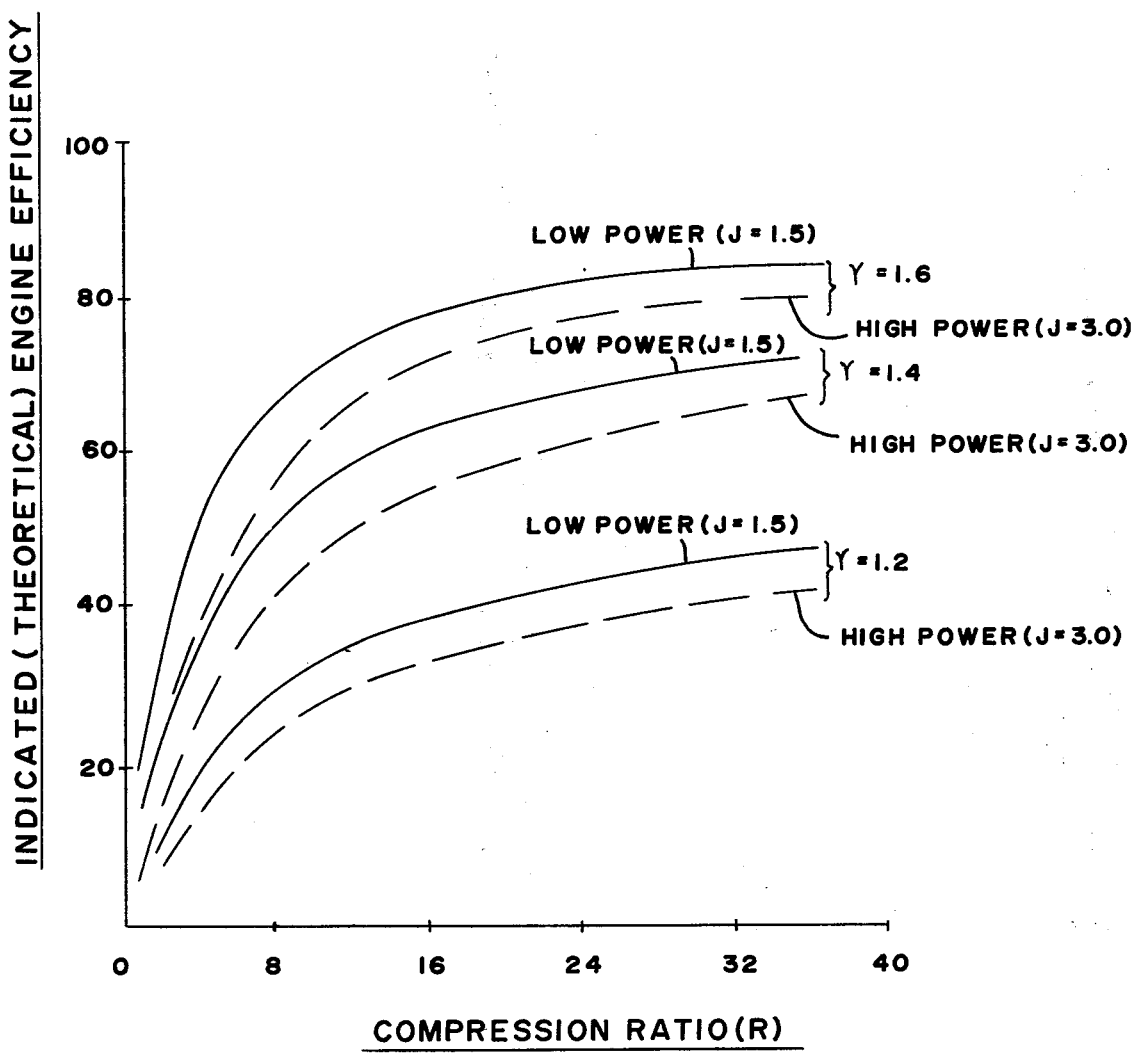
FIG. 2 is a graph showing the theoretical efficiency of hydrogen-fueled engines.

The desirability of utilizing a working fluid of large specific heat ratio $\gamma$, arises from its ability to produce high peak cylinder pressures under adiabatic compression, and maximum energy extraction during the expansion phase of the engine cycle. The theoretical efficiency of an engine operating at various compression ratios R, combustion intervals J, and specific heat ratios $\gamma$ are shown in the graph of FIG. 2. The combustion interval J, with gaseous nitrogen as a fuel, is essentially the interval during which hydrogen is injected and combusted. Specifically, J equals the cylinder volume at the end of combustion (which normally occurs a short time after injection of fuel ceases), divided by the minimum cylinder volume (when the piston is at top dead center). The injection of gaseous hydrogen normally occurs between the time a piston reaches top dead center and the time it reaches a point less than 30° past top dead center. A long injection schedule sustains the pressure to increase the power output of the engine, but reduces the theoretical efficiency of the engine since much of the pressure is lost at the end of the piston stroke. The compression ratio R is the ratio between the volume within the cylinder at the beginning of compression by the piston, to the volume at top dead center when the volume within the cylinder is a minimum. Although the theoretical efficiency can be maximized by using a large compression ratio, physical limitations exist and increased mechanical losses are produced at higher compression ratios. Thus, a major factor which is available to increase efficiency is the specific heat ratio $\gamma$.

A formula for indicated (theoretical) engine efficiency N, as a function of the compression ratio R, the combustion duration interval J, and the ratio of specific heats $\gamma$ is given below:

$$N = 1 - \frac{1}{R^{(\gamma-1)}} \left| \frac{J^{\gamma-1}}{\gamma^{(J-1)}} \right| \qquad \text{Equation 1}$$

FIG. 2 provides graphs of the theoretical efficiencies at different compression ratios R, combustion intervals J, and specific heat ratios $\gamma$. It can be seen that the use of a gas of high specific heat ratio $\gamma$, such as 1.6, can produce a considerably higher efficiency than can be produced with gases of lower specific heat ratio. For example, at a combustion interval of 1.5 and a compression ratio of 16, a gas of a specific heat ratio $\gamma$ of 1.6 provides a theoretical efficiency of approximately 78%, while a gas with a specific heat ratio $\gamma$ of 1.4 (equal to that of air) provides a theoretical efficiency of about 63%, or in other words about 19% less.

The following table provides a comparison of the above-described properties of different gases which can be utilized in an engine:

| Substance | $C_p$ (Constant) Pressure | Specific Heat Cal—gm$^{-1}$—° K$^{-1}$ $C_v$ (Constant) Volume | $\gamma$ ($C_p$/$C_v$) | Thermal Conductivity cal—cm$^{-1}$—sec$^{-1}$—K$^{-1}$ |
|---|---|---|---|---|
| Air | .2404 | .1715 | 1.401 | 7.197 × 10$^{-5}$ |
| H$_2$ | 3.428 | 2.442 | 1.404 | 49.94 × 10$^{-5}$ |
| O$_2$ | .2187 | .1563 | 1.399 | 7.427 × 10$^{-5}$ |
| CO$_2$ | .2064 | .1626 | 1.281 | 5.06 × 10$^{-5}$ |
| NO$_2$ | — | — | — | 8.88 × 10$^{-5}$ |
| He | 1.248 | .752 | 1.660 | 39.85 × 10$^{-5}$ |
| Ar | .1252 | .07531 | 1.668 | 4.238 × 10$^{-5}$ |
| Kr | .04 | .0238 | 1.68 | 2.26 × 10$^{-5}$ |
| Ne | .25 | .152 | 1.64 | 11.75 × 10$^{-5}$ |
| Xe | .04 | .024 | 1.66 | |
| N$_2$ | .248 | .177 | 1.40 | 7.18 × 10$^{-5}$ |
| Steam | .4801 | .3657 | 1.310 | 5.510 × 10$^{-5}$ |

It can be seen that the noble gases (He, Ar, Kr, Ne, and Xe), which are monatomic, all have a high specific heat ratio $\gamma$ of more than 1.6, which is considerably more than the specific heat ratio of 1.4 for air which is composed primarily of diatomic gases. As described above, it is desirable to provide a gas of large $\gamma$, low $C_p$ and low thermal conductivity. The optimal gas would be krypton, with argon being a close second choice. From a practical standpoint, argon is the best choice because of its availability, since argon constitutes approximately 1% of air while krypton constitutes only about one-ten thousandth of one percent of air. Argon can be obtained from air by liquifying the air.

A closed cycle energy system of the type illustrated in FIG. 1 can be used to produce energy in a variety of locations, such as in desert-like environments where large amounts of sunlight are available but water is not readily available. This is because substantially all of the water used to generate the fuel and oxidizer can be recovered, and the inert gas used as the working fluid can be easily separated from the rest of the exhaust and reused. Of course, inert gas can be effectively utilized in a hydrogen-powered engine for other applications, because of the higher efficiency of engine operation.

Thus, the invention provides a hydrogen-fueled engine of high efficiency and which produces substantially no pollution. This is accomplished by utilizing a mixture of oxygen and an inert gas, as the atmosphere within the engine in which the hydrogen is combusted. The inert gas is chosen so it has a large specific heat ratio of about 1.6 or more, and is inert in the presence of oxygen and hydrogen at a typical combustion temperature on the order of 3000° C to avoid the generation of pollutants. An especially appropriate inert gas is argon. This fueling arrangement enables the provision of a relatively simple closed cycle energy system, wherein the exhaust can be cooled to produce water and the inert gas, which are easily separated and which each can be recycled for reuse in the engine.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A method for operating a hydrogen-fueled internal combustion engine comprising:
   introducing a mixture of oxygen and a working fluid into the cylinder of said engine;
   compressing said mixture; and
   injecting hydrogen into the cylinder, to combust the oxygen and hydrogen;
   a majority of said working fluid consisting of a noble gas.

2. The method described in claim 1 including:
   cooling the exhaust of said engine to convert the steam to water, and returning the gas in the cooled exhaust to the cylinder of said engine.

3. A method for operating a closed cycle energy system comprising:
   separating hydrogen and oxygen out of water;
   delivering oxygen and a monatomic inert gas to the combustion chamber of an engine;
   compressing the oxygen and inert gas in said chamber;
   injecting hydrogen into said chamber when the oxygen and inert gas therein are compressed, to raise the gas pressure, and then produce work while lowering the pressure;
   cooling the exhaust gas from said engine to produce water and said inert gas, for reuse in engine operation.

4. A method for operating a hydrogen-fueled engine comprising:
   introducing into a combustion chamber oxygen and an inert monatomic gas that is inert in the presence of oxygen and hydrogen at a temperature of 3000° C.;
   compressing the oxygen and inert gas in said combustion chamber;
   injecting hydrogen into said combustion chamber at a time when the oxygen and inert gas therein are compressed, and allowing said hydrogen to ignite;
   exhausting the gas in said combustion chamber; and
   extracting inert gas from the exhaust gas.

5. The method described in claim 4 wherein: said inert gas comprises primarily argon.

6. The method described in claim 4 wherein: said oxygen and hydrogen are introduced into said combustion chamber in a substantially stoichiometric ratio; so that the exhaust consists substantially of water and inert gas; and including
   separating the water and inert gas in said exhaust and separating the water into oxygen and hydrogen.

* * * * *